(12) United States Patent
Hamada

(10) Patent No.: US 7,894,016 B2
(45) Date of Patent: Feb. 22, 2011

(54) LIQUID CRYSTAL DISPLAY

(75) Inventor: Tetsuya Hamada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 186 days.

(21) Appl. No.: 12/282,917

(22) PCT Filed: Nov. 2, 2006

(86) PCT No.: PCT/JP2006/321940

§ 371 (c)(1),
(2), (4) Date: Sep. 15, 2008

(87) PCT Pub. No.: WO2007/129419

PCT Pub. Date: Nov. 15, 2007

(65) Prior Publication Data

US 2009/0128732 A1    May 21, 2009

(30) Foreign Application Priority Data

Apr. 10, 2006   (JP)   ............................... 2006-107088

(51) Int. Cl.
*G02F 1/1333* (2006.01)
(52) U.S. Cl. ........................................................ 349/58
(58) Field of Classification Search .................... 349/58
See application file for complete search history.

(56) References Cited

U.S. PATENT DOCUMENTS

| 6,697,130 | B2 * | 2/2004 | Weindorf et al. ............... 349/65 |
| 2005/0141244 | A1 | 6/2005 | Hamada et al. |
| 2006/0044835 | A1 | 3/2006 | Oami |
| 2009/0066877 | A1 * | 3/2009 | Abe et al. ..................... 349/62 |
| 2009/0290088 | A1 * | 11/2009 | Kwak ........................... 349/58 |
| 2009/0316064 | A1 * | 12/2009 | Kono et al. ................... 349/58 |
| 2010/0066947 | A1 * | 3/2010 | Hathaway .................... 349/69 |

FOREIGN PATENT DOCUMENTS

| CN | 1716041 A | 1/2006 |
| JP | 2003-215547 A | 7/2003 |
| JP | 2006-011242 A | 1/2006 |

OTHER PUBLICATIONS

Official Communication issued in International Patent Application No. PCT/JP2006/321940, mailed on Feb. 6, 2007.

* cited by examiner

*Primary Examiner*—Sung H Pak
(74) *Attorney, Agent, or Firm*—Keating & Bennett, LLP

(57) ABSTRACT

In a liquid crystal display, an opening is formed in a lateral surface of a bezel of an LCD unit, and the opening serves as an LED module insert slot. An LED of an LED module is arranged on a substrate so as to emit light toward a light guide plate provided on the backside of a liquid crystal panel. The LED module is inserted into the LED module insert slot and fixed to a back plate arranged on the backside of the LED unit by using a fixing member such as a screw.

9 Claims, 5 Drawing Sheets

LIQUID CRYSTAL DISPLAY

BACKGROUND OF THE INVENTION

1. Field of the Invention

The present invention relates to a liquid crystal display having an illuminating device, and specifically to a liquid crystal display having a backlight.

2. Description of the Related Art

In recent years, display devices using a liquid crystal panel, which is thinner than a CRT (cathode ray tube), have been widely used. The liquid crystal panel, not emitting light itself, displays an image by using external light or by being irradiated with light from an illuminating device.

Examples of illuminating devices for use in liquid crystal displays include the sidelight type backlight proposed in JP-A-2005-196989 (page 9, FIG. 7). This is used by being placed behind a liquid crystal panel, and is formed of a flat acrylic resin plate called a light guide plate and LEDs (light emitting diodes) that are placed on a lateral surface of the light guide plate to serve as a light source. Light emitted from the LEDs enters the light guide plate from its lateral surface to propagate through the inside of the light guide plate, and is then emitted from a light emitting surface formed on the top surface of the light guide plate to illuminate the liquid crystal panel.

In the sidelight type backlight proposed in JP-A-2005-196989, an LED module formed by soldering LEDs to a substrate is fixed to an LED housing that is U-shaped in section with, for example, an adhesive. In this case, when the LED module needs to be replaced because of deterioration of an LED, the backlight needs to be disassembled to take the LED housing out of the light guide plate so as to replace the whole LED housing. Even in the case where the LED module is fixed using a screw, the LED housing needs to be removed to unscrew the screw so as to replace the LED module.

SUMMARY OF THE INVENTION

In order to overcome the problems described above, preferred embodiments of the present invention provide a liquid crystal display in which an LED module can be replaced without disassembling the liquid crystal display.

According to a preferred embodiment of the present invention, a liquid crystal display includes: a liquid crystal panel; a frame that surrounds the liquid crystal panel; a light guide plate that is disposed behind the liquid crystal panel so as to irradiate the liquid crystal panel with light; an LED that emits light toward a lateral surface of the light guide plate; a first substrate having the LED; and a rear plate that covers a rear surface of the liquid crystal panel and a rear surface of the frame, and to which the first substrate is fixed with a fixing member. The frame preferably has an opening which the first substrate having the LED can be inserted into and removed from, and the first substrate is fixed with a fixing member inserted from outside the rear plate. As the fixing member, for example, a screw can be used.

According to a preferred embodiment of the present invention, an LED module, which is a substrate having an LED can be removed from a liquid crystal display simply by removing a fixing member, and thus a liquid crystal display can be obtained in which the LED module can be replaced more easily than in the case where the liquid crystal display needs to be disassembled to replace the LED module.

According to a preferred embodiment of the present invention, at least one fixing member is provided near each of two opposite ends of the first substrate and at least one fixing member is provided near a center between the two opposite ends of the first substrate. Thus, compared with the case where fixing members are provided only at the two opposite ends of the first substrate or the case where they are provided only at one end and at the center of the first substrate, the area of the first substrate that comes out of contact with the rear plate due to a warp occurring in the first substrate can be reduced; as a result, larger amount of heat generated by the LED can be dissipated to the outside from the first substrate through the rear plate. This makes it possible to stabilize the operation of the LED, whose light emitting properties are liable to change with temperature.

According to a preferred embodiment of the present invention, even in the case where a driver for driving the liquid crystal panel is provided on the rear plate, only the fixing members need to be removed to take the LED module out of the liquid crystal display.

According to a preferred embodiment of the present invention, by arranging a reflective member so as to surround the LED, light emitted from the LED that does not directly enter the light guide plate can be reflected by the reflective member to enter the light guide plate. This helps increase the brightness of light outputted from the light guide plate without increasing the number of LEDs and the amount of current.

According to a preferred embodiment of the present invention, by forming at least the first substrate and the rear plate of a material such as aluminum and copper that has thermal conductivity of 80 W/m·K or greater, a larger amount of heat generated by the LED can be dissipated to the outside via the first substrate and the rear plate. In conventional sidelight type backlights, a CCFL (cold cathode fluorescent lamp), which does not generate as much heat as an LED, is used as a light source, as the first substrate is used a printed circuit board made by forming a conductor made of copper foil on an insulating plate made of bakelite or epoxy resin or an FPC (flexible printed circuit) made by forming a conductor of copper foil between two polyimide films, and the rear plate is formed of plastic such as polycarbonate. These materials have a low thermal conductivity, which makes it difficult, when an LED is used as the light source, for heat generated by the LED to be dissipated. As a result, the temperature of the LED easily rises.

According to a preferred embodiment of the present invention, by providing a thermally conductive member between the first substrate and the rear plate, a larger amount of heat generated by the LED can be dissipated to the outside from the first substrate through the rear plate.

According to a preferred embodiment of the present invention, by providing a member having a higher heat release rate than the first substrate on at least one of a surface of the first substrate that faces the rear plate and a surface of the rear plate that faces the first substrate, a larger amount of heat generated by the LED can be dissipated to the outside from the first substrate via the rear plate.

According to a preferred embodiment of the present invention, there can be used either of a side-view type LED that emits light in a direction parallel or substantially parallel to the surface on which it is disposed and a top-view type LED that emits light in a direction perpendicular or substantially perpendicular to the surface on which it is disposed.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
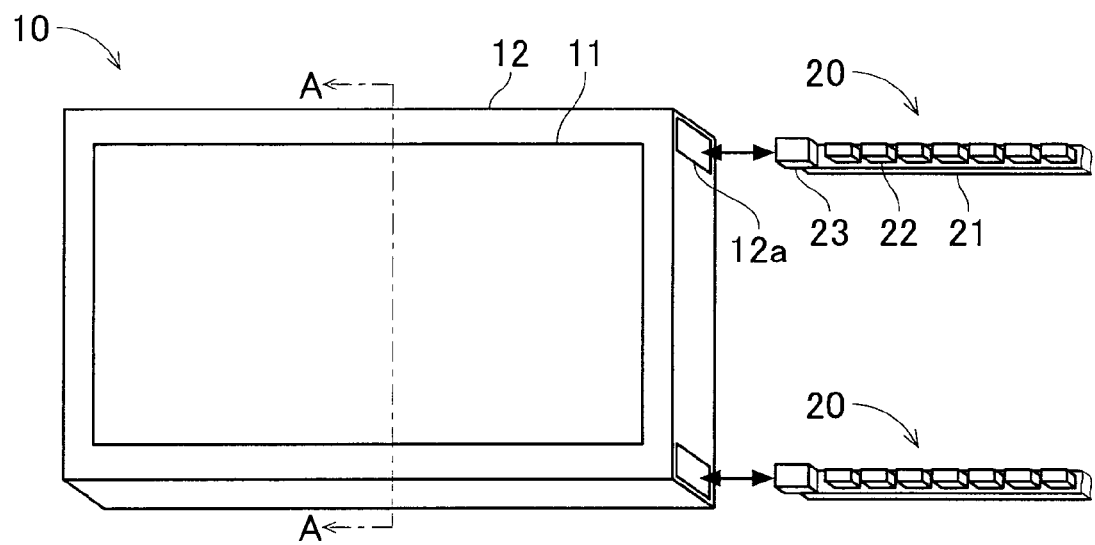
FIG. 1 is a perspective view showing an LCD unit of a first preferred embodiment of the present invention as seem from the outside.

A description will be given of a first preferred embodiment of the present invention with reference to the drawings. FIG. 1 is a perspective view showing an LCD (liquid crystal display) unit of the first preferred embodiment of the present invention as seen from outside, FIG. 2 is a sectional view showing a portion taken along line A-A in FIG. 1, FIG. 3 is a diagram schematically showing the structure of an LED module, and FIG. 4 is a plan view showing a rear surface of the LED unit of the first preferred embodiment.

Figure 2:
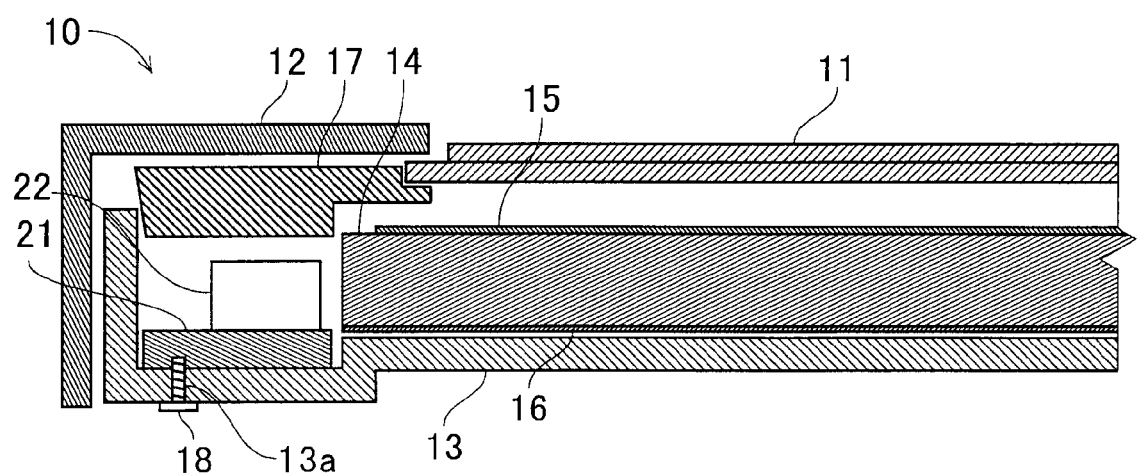
FIG. 2 is a sectional view showing a portion taken along line A-A in FIG. 1.

As shown in FIGS. 1 and 2, the LCD unit 10 includes a liquid crystal panel 11, a bezel 12 serving as a frame surrounding the liquid crystal panel 11, and a rear plate 13 that covers rear surfaces of the liquid crystal panel 11 and the bezel 12. The bezel 12 preferably is frame-shaped, being L-shaped in section and having an opening, and the rear plate 13 has a shape of rectangular solid without a lid; they are arranged such that the bezel 12 covers lateral surfaces of the rear plate 13. The liquid crystal panel 11 includes a TFT substrate, a counter substrate, and liquid crystal enclosed between them. The alignment of the liquid crystal is controlled by applying a voltage between the substrates, and thereby an image is displayed. A light guide plate 14 is provided between the liquid crystal panel 11 and the rear plate 13, an optical sheet 15 is provided on a surface of the light guide plate 14 that faces the liquid crystal panel 11, and a reflective sheet 16 is provided on a surface of the light guide plate 14 that faces the rear plate 13.

Inside the bezel 12, a plastic frame 17 and an LED module 20 are provided. The plastic frame 17 is adapted to hold the liquid crystal panel 11, and the LED module 20 is adapted to irradiate the liquid crystal panel 11 with white light from behind. FIG. 2 shows only one end side of the LCD unit 10, and the other end side of the LCD unit 10 has the same structure. The LED module 20 and the light guide plate 14 constitute a sidelight type backlight.

Figure 3:
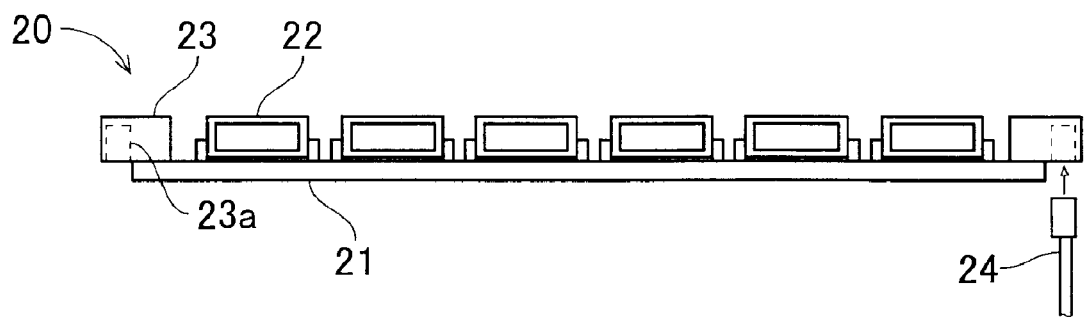
FIG. 3 is a diagram schematically showing the structure of an LED module.
Figure 4:
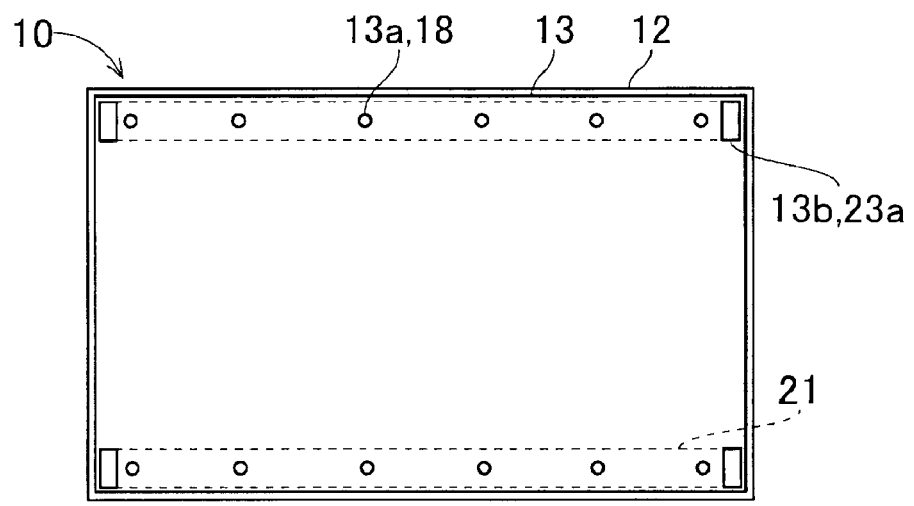
FIG. 4 is a plan view showing a rear surface of the LED unit of the first preferred embodiment of the present invention.

As shown in FIG. 3, the LED module 20 is formed by soldering a plurality of LEDs 22 and two LED driving conductor connectors 23 to a conductor substrate 21 that is a metal plate on which a conductor pattern is formed. The LED driving conductor connectors 23 are provided one at each of two opposite ends of the conductor substrate 21, and the LEDs 22 are arranged between the LED driving conductor connectors 23. The LEDs 22, which are of a side-view type, emit light in a direction parallel or substantially parallel to the surface of the conductor substrate 21 on which they are arranged, and they are arranged such that they emit light in a direction perpendicular or substantially perpendicular to the direction in which they are arranged; in other words, they are arranged such that light emitting surfaces of the LEDs 22 face a lateral surface of the light guide plate 14 when the LED module 20 is disposed in the LCD unit 10. The LED driving conductor connectors 23 each have a power supply connector 23a to which is connected a power supply cable 24 for supplying power from an LED driver (not shown).

As shown in FIG. 4, a plurality of LED module fixing-screw holes 13a and LED power supply-connector windows 13b are formed in the rear plate 13. Thus, the LED module 20 can be fixed with screws 18, and the power supply cables 24 can be attached to and detached from the power supply connectors 23a of the LED driving conductor connectors 23, with the LED module 20 fixed to the LCD unit 10.

Light emitted from the LEDs 22 enters the light guide plate 14 from the lateral surface thereof, propagates through the inside of the light guide plate 14, and is emitted from a light emitting surface that faces the liquid crystal panel 11. Light emitted toward the reflective sheet 16 from the light guide plate 14 reenters the light guide plate 14 by being reflected by the reflective sheet 16, and is also emitted from the light emitting surface. Light emitted from the light emitting surface is scattered by the optical sheet 15, and illuminates an image displayed on the liquid crystal panel 11.

Here, it is preferable that the rear plate 13 and the conductor substrate 21 of the LED module 20 be formed of a material such as aluminum and copper having thermal conductivity of 80 W/m·K or greater, for example. With this structure, heat generated by the LEDs 22 can be dissipated to the outside via the conductor substrate 21 and the rear plate 13, and thereby temperature change in the LEDs 22 can be reduced, and this helps stabilize the operation of the LEDs 22, which are liable to change with temperature in light emitting properties.

In this preferred embodiment, in a lateral surface of the bezel 12 and a lateral surface of the rear plate 13, there are formed LED module insert slots 12a into each of which the LED module 20 can be freely inserted and from each of which the LED module 20 can be freely removed. FIG. 1 shows only the LED module insert slots 12a formed in the bezel 12, and does not show those formed in the rear plate 13. By forming the LED module insert slots 12a in this way, in the case where the LED module 20 needs to be replaced because of, for example, reduction of the brightness of the LEDs 22 and non-uniformity caused thereby in light emitted from the light emitting surface of the light guide plate 14, the LED module 20 can be taken out of the LCD unit 10 just by unscrewing the screws 18 with which the LED module 20 is fixed to the rear plate 13. Thus, the LED module 20 can be replaced without disassembling the LED unit 10.

Second Preferred Embodiment

Figure 5:
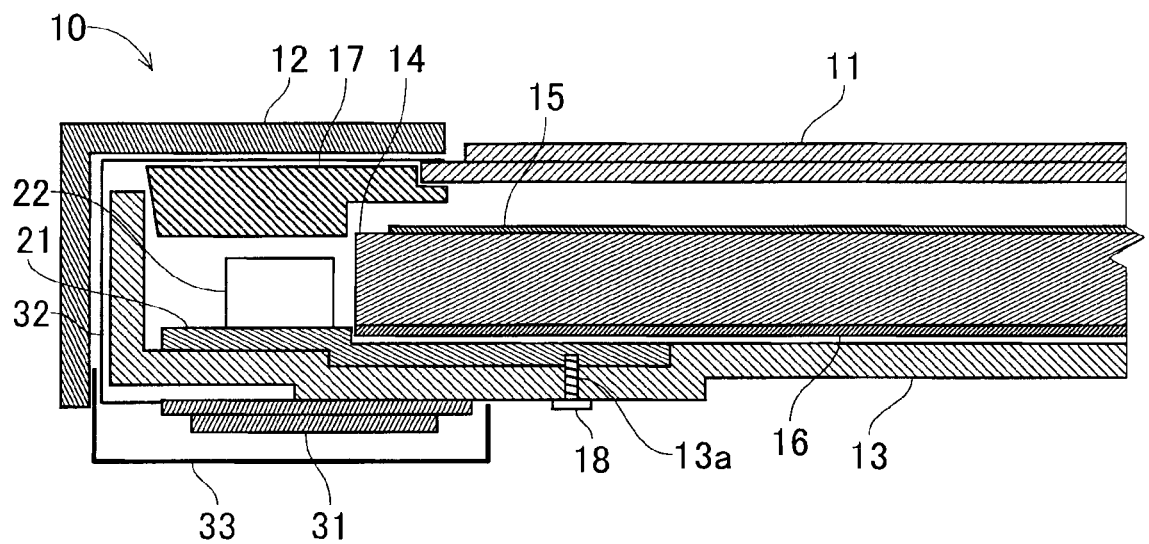
FIG. 5 is a sectional view showing a portion of an LCD unit of a second preferred embodiment of the present invention.
Figure 6:
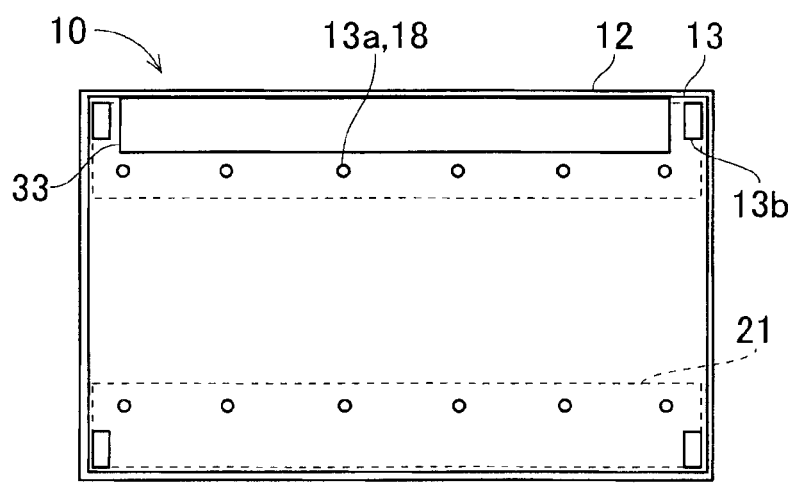
FIG. 6 is a plan view showing a rear surface of the LCD unit of the second preferred embodiment of the present invention.

Next, a description will be given of the second preferred embodiment of the present invention with reference to the drawings. FIG. 5 is a sectional view showing a portion taken along line A-A of FIG. 1 that shows an LCD unit of the second preferred embodiment, and FIG. 6 is a plan view showing a rear surface of the LCD unit. The second preferred embodiment is similar to the first preferred embodiment except that an LED driver substrate is provided below the rear plate and that the locations of the LED module fixing screw holes are different, and portions that are practically the same as in the first preferred embodiment are identified with the same reference numerals.

As shown in FIGS. 5 and 6, the LCD unit 10 of this preferred embodiment is provided with an LCD driver substrate 31 that faces the LEDs 22 with the rear plate 13 interposed therebetween and a cover 33 for covering the LCD driver substrate 31. The LCD driver substrate 31 and the liquid crystal panel 11 are electrically connected to each other by a conductor 32. The conductor substrate 21 of the LED module 20 is disposed such that it extends to a position on the reflective sheet 16 provided on the light guide plate 14 where the conductor substrate 21 does not face the LCD driver substrate 31. In a portion of the rear plate 13 that faces the conductor substrate 21 but does not face the LCD driver substrate 31, a plurality of the LED module fixing screw holes 13a are formed, and the rear plate 13 and the conductor substrate 21 are fixed to each other with screws at these LED module fixing screw holes 13a.

In this preferred embodiment, neither the LCD driver substrate 31 nor the cover 33 is provided on the side of the LCD unit 10 that is not shown in FIG. 5; like the LCD module 20 provided with the LCD driver substrate 31 of this preferred embodiment, the LED module 20 on this side may be formed such that a portion of the conductor substrate 21 faces the light guide plate 14, or, may be formed such that, as has been described in the first preferred embodiment, the conductor substrate 21 does not face the light guide plate 14. FIG. 6 shows the case where the conductor substrate 21 is formed to face the light guide plate 14. In the case where the conductor substrate 21 is formed such that a portion thereof faces the light guide plate 14, identical LED modules can be used as the LED modules 20 disposed one at each end, and this helps reduce the cost. On the other hand, in the case where the conductor substrate 21 is formed such that it does not face the light guide plate 14, the conductor substrate 21 can be formed to have a minimum size, and this helps make the LCD unit 10 compact.

In this embodiment, too, as in the first preferred embodiment, the LED module insert slots 12a are formed in the lateral surface of the bezel 12 such that the LED modules 20 can be inserted into and removed from the LED module insert slots 12a.

With this structure, even in the case where the LCD driver substrate 31 and the LCD unit 10 are integral with each other, the LED modules 20 can be replaced without disassembling the LCD unit 10.

In the first and the second preferred embodiments, the LCD unit 10 may be formed in the following manner. Hereinafter, a description will be given of the case where this structure is applied to the second preferred embodiment, but this structure can also be applied to the first preferred embodiment.

Figure 7:
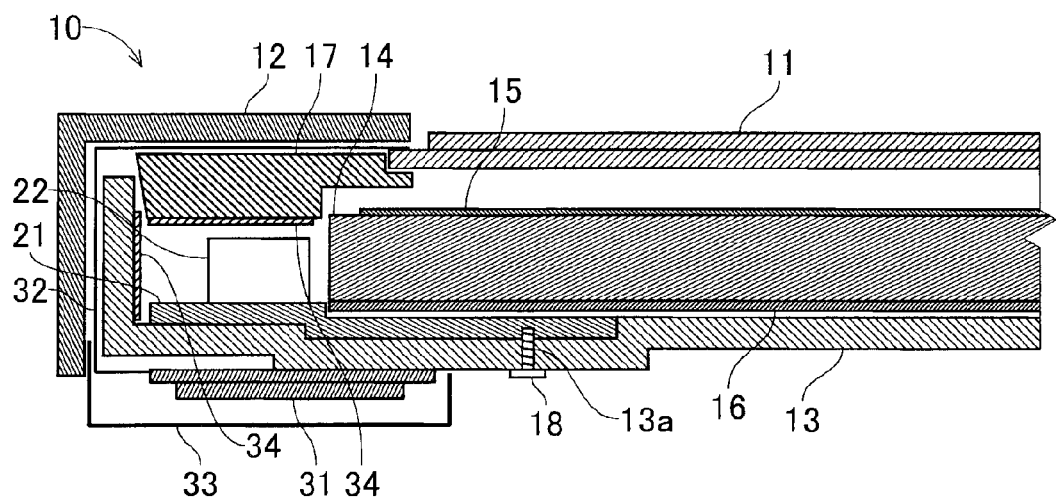
FIG. 7 is a sectional view showing a portion of another example of the LCD unit of the second preferred embodiment of the present invention.

FIG. 7 shows the case where a reflective plate for reflecting light is provided in the space around the LED module 20 inside the LCD unit 10. In this case, two reflective plates 34 are provided, one on a surface of the plastic frame 17 that faces the LEDs 22 and the other on the lateral surface of the rear plate 13 that faces the LEDs 22. This makes it possible for light scattered or reflected toward the rear side of the LEDs 22 to be reflected back to the light guide plate 14; as a result, the brightness of the light emitted from the light guide plate 14 can be increased without increasing the number of the LEDs 22 to be provided or the amount of current, and thus power consumption can be reduced.

Figure 8:
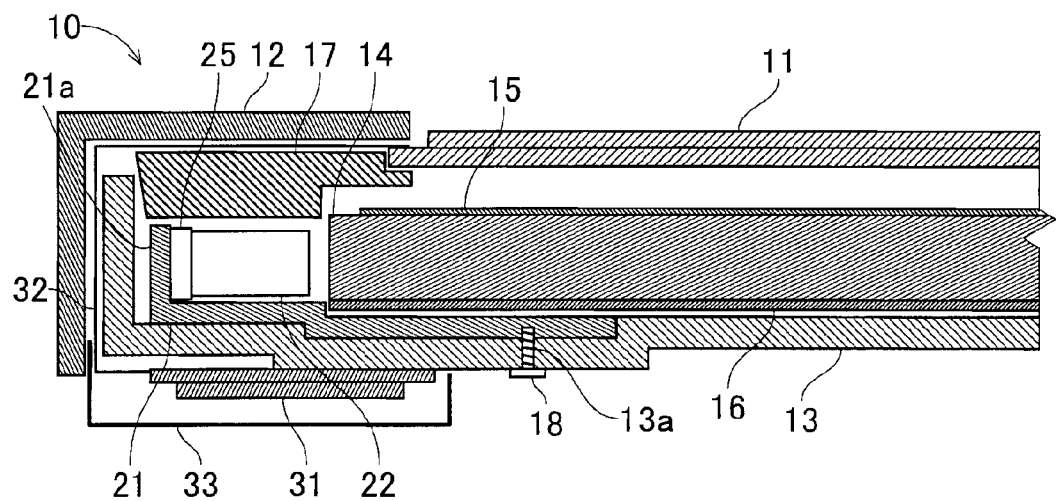
FIG. 8 is a sectional view showing a portion of another example of the LCD unit of the second preferred embodiment of the present invention.

FIG. 8 shows the case where, in the second preferred embodiment, the LEDs 22 are of a top-view type that emits light in a direction perpendicular or substantially perpendicular to a surface to which they are soldered. In this case, the conductor substrate 21 of the LED module 20 is preferably formed to be L-shaped in section. The LEDs 22 are soldered to a sub substrate 25, and the sub substrate 25 is fixed with a screw to a portion of the conductor substrate 21 that is perpendicular to the bottom surface of the rear plate 13. This structure makes it possible to use top-view type LEDs in the preferred embodiments of the present invention. Incidentally, the top-view type LEDs can be used even in the case where no sub substrate 25 is provided and the LEDs 22 are soldered directly to the part of the conductor substrate 21 that is perpendicular to the bottom surface of the rear plate 13.

Figure 9:
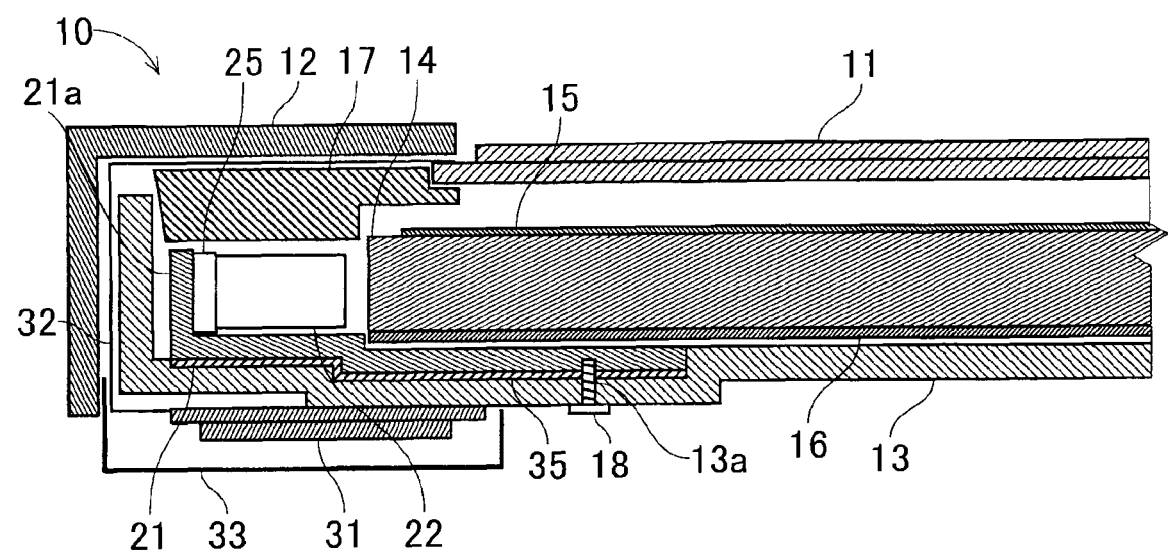
FIG. 9 is a sectional view showing a portion of another example the LCD unit of the second preferred embodiment of the present invention.

FIG. 9 shows the case where a thermally conductive sheet 35 is provided between the conductor substrate 21 and the rear plate 13 in the second preferred embodiment. The thermally conductive sheet 35 is a silicone or an acrylic sheet that is closely attached to the conductor substrate 21 and the rear plate 13. The provision of the thermally conductive sheet 35 helps efficiently transfer heat generated by the LEDs 22 from the conductor substrate 21 to the rear plate 13; this enables heat generated by the LEDs 22 to be dissipated more efficiently, and as a result, the light emitting efficiency and the durability of the LEDs 22 can be improved.

Instead of this thermally conductive sheet 35, a member (not shown) having a higher heat release rate than the conductor substrate 21 may be provided on at least one of the surface of the conductor substrate 21 that faces the rear plate 13 and the surface of the rear plate 13 that faces the conductor substrate 21. This material having a high heat release rate can be formed by applying resin paint such as so-called ink or Shellac α (trademark) which is liquid ceramic. Since a material having a high heat release rate also has a high heat absorption rate, when it is provided on the conductor substrate 21, it helps improve the heat release rate of the conductor substrate 21, and when it is provided on the rear plate 13, it helps improve the heat absorption rate of the rear plate 13. Thus, as in the case where the thermally conductive sheet 35 is provided, heat generated by the LEDs 22 can be efficiently transferred from the conductor substrate 21 to the rear plate 13, contributing to more efficient dissipation of heat generated by the LEDs 22, and as a result, the light emitting efficiency and the durability of the LEDs 22 can be improved. This member having the high heat release rate can be provided together with the thermally conductive sheet 35.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display, comprising:
   a liquid crystal panel;
   a frame that surrounds the liquid crystal panel;
   a light guide plate that is disposed behind the liquid crystal panel and irradiates the liquid crystal panel with light;
   an LED that emits light toward a lateral surface of the light guide plate;
   a first substrate having the LED; and
   a rear plate that covers a rear surface of the frame and a rear surface of the liquid crystal panel, and to which the first substrate is fixed with a fixing member; wherein
   the frame has an opening which the first substrate having the LED can be inserted into and removed from; and
   the first substrate is fixed with a fixing member inserted from outside the rear plate.

2. The liquid crystal display of claim 1, wherein the fixing member is provided at least one near each of two opposite ends of the first substrate in a direction in which the first substrate is inserted into and removed from the opening and at least one near a center between the two opposing ends of the first substrate in the direction in which the first substrate is inserted into and removed from the opening.

3. The liquid crystal display of claim 1, further comprising a second substrate that has a driver arranged to drive the liquid crystal panel and that is located opposite from the LED with the rear plate placed therebetween, wherein the first substrate is arranged to extend along the light guide plate to a position where the first substrate does not face the second substrate, and the first substrate is fixed to the rear plate with a fixing member inserted from outside the rear plate at a position on the rear plate where the first substrate does not face the second substrate.

4. The liquid crystal display of claim 1, wherein a reflective member is provided at a portion inside the frame that faces the LED.

5. The liquid crystal display of claim 1, wherein at least the first substrate and the rear plate are formed of material having thermal conductivity of about 80 W/m·K or greater.

6. The liquid crystal display of claim 1, wherein a thermally conductive member is provided between the first substrate and the rear plate.

7. The liquid crystal display of claim 1, wherein a member having a higher heat release rate than the first substrate is provided on at least one of a surface of the first substrate that faces the rear plate and a surface of the rear plate that faces the first substrate.

8. The liquid crystal display of claim 1, wherein the LED is a side-view LED that emits light in a direction parallel or substantially parallel to a surface on which the LED is provided.

9. The liquid crystal display of claim 1, wherein the first substrate is substantially L-shaped in section and has a surface that is parallel or substantially parallel to the lateral surface of the light guide plate, and the LED is a top-view LED that emits light in a direction perpendicular or substantially perpendicular to a surface on which the LED is provided, and the LED is provided on the surface of the first substrate that is parallel or substantially parallel to the lateral surface of the light guide plate.

* * * * *